United States Patent
Kawasaki et al.

(10) Patent No.: US 7,128,371 B2
(45) Date of Patent: Oct. 31, 2006

(54) SEAT STRUCTURE

(75) Inventors: Seiji Kawasaki, Hiroshima (JP); Shusuke Takahashi, Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 55 days.

(21) Appl. No.: 10/684,407

(22) Filed: Oct. 15, 2003

(65) Prior Publication Data

US 2004/0130201 A1 Jul. 8, 2004

(30) Foreign Application Priority Data

Oct. 16, 2002 (JP) ............................. 2002-302039

(51) Int. Cl.
*A47C 7/02* (2006.01)
(52) U.S. Cl. ............... 297/284.2; 297/218.1; 297/228.13; 297/452.12; 297/354.13; 297/354.12
(58) Field of Classification Search ............ 297/218.1, 297/218.2, 218.3, 218.4, 218.5, 228.13, 452.12, 297/452.13, 452.38, 284.2, 284.9, 452.56
See application file for complete search history.

(56) References Cited

U.S. PATENT DOCUMENTS

| | | | | | |
|---|---|---|---|---|---|
| 3,220,767 | A | * | 11/1965 | Hendrickson | 297/228.12 |
| 3,630,572 | A | * | 12/1971 | Homier | 297/452.6 |
| 4,047,756 | A | * | 9/1977 | Ney | 297/219.1 |
| 4,072,345 | A | * | 2/1978 | Matsuda | 297/184.15 |
| 4,789,201 | A | * | 12/1988 | Selbert | 297/218.1 |
| 5,401,075 | A | * | 3/1995 | Venuto et al. | 297/218.2 |
| 5,560,683 | A | * | 10/1996 | Penley et al. | 297/452.56 |
| 5,934,757 | A | * | 8/1999 | Smith | 297/452.13 |
| 6,079,779 | A | * | 6/2000 | Tanaka et al. | 297/228.13 |
| 6,302,487 | B1 | * | 10/2001 | Fujita et al. | 297/452.56 |
| 6,604,792 | B1 | * | 8/2003 | Picard | 297/452.56 |

* cited by examiner

*Primary Examiner*—Laurie K. Cranmer
(74) *Attorney, Agent, or Firm*—Wenderoth, Lind & Ponack, L.L.P.

(57) ABSTRACT

A seat structure includes a seat frame, a three-dimensional net stretched over the seat frame, a skin material for selectively covering the three-dimensional net, and a fastener for connecting a portion of the skin material and the three-dimensional net. The fastener is selectively opened or closed to change a surface rigidity of the seat structure.

4 Claims, 5 Drawing Sheets

(a)

(b)

SEAT STRUCTURE

BACKGROUND OF THE INVENTION

1. Field of the Invention

The present invention relates to a seat structure in which a three-dimensional net having a large hysteresis loss is employed.

2. Description of the Related Art

Conventional automobile seats generally include spring members attached to a seat frame, a pad material such as a foamed material or cotton placed thereon, and a skin such as a vinyl leather, woven cloth, or leather covered thereon.

On the other hand, seats other than the automobile seats generally include a pad material placed on the frame and covered with a skin, and some of them also include spring members for enhancing the cushioning characteristics.

Although the spring members or the pad material acts to provide desired cushioning characteristics, conventional seats are mostly thick, heavy and costly.

In view of the above, a variety of lightweight, inexpensive and thin seats have been recently proposed, and the inventors of this application have developed thin seats having a lightweight net of a three-dimensional structure that is provided with desired characteristics (spring characteristics, damping characteristics and the like) sufficient for a cushioning material.

FIG. 5 depicts an example of the seat structures employing the three-dimensional net that has been developed by the inventors of this application, and particularly depicts a horizontal section of a seat back.

In the seat structure of FIG. 5, a three-dimensional net 52 stretched over a seat back frame 50 is selectively covered with a skin material 54. The skin material 54 is sewn on the three-dimensional net 52, to which is applied a predetermined tension by a plurality of tension members 56.

With this structure, because the three-dimensional net 52 is sewn together with the skin material 54 at a location where the back of a seat occupant is brought into contact with the skin material 54, this location is high in surface rigidity and, hence, expansion and contraction of the three-dimensional net 52 takes place at locations other than the central portion (the portion with which the back of the seat occupant is brought into contact).

Although the automobile seats employing the three-dimensional net are lightweight and have certain cushioning characteristics, they do not have a structure capable of selecting a riding feeling of being high in surface rigidity or a riding feeling in which the body of the seat occupant fits well with the seat and, hence, there is still room for improvement.

SUMMARY OF THE INVENTION

The present invention has been developed to overcome the above-described disadvantages.

It is accordingly an objective of the present invention to provide a seat structure having an openable fastener that is attached to a skin of a seat back or that of a seat cushion to select the riding feeling of being high in surface rigidity or the riding feeling in which the body of the seat occupant fits well with the seat.

In accomplishing the above and other objectives, the seat structure according to the present invention includes a seat frame, a three-dimensional net stretched over the seat frame, a skin material for selectively covering the three-dimensional net, and a fastener for connecting a portion of the skin material and the three-dimensional net. The fastener can be selectively opened or closed to change a surface rigidity of the seat structure.

The seat structure may include a cushioning material inserted between the three-dimensional net and the skin material to reduce the vibration transmissibility.

It is preferred that the portion of the skin material be a portion with which the back of a seat occupant is brought into contact.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

This application is based on an application No. 2002-302039 filed Oct. 16, 2002 in Japan, the content of which is herein expressly incorporated by reference in its entirety.

Figure 1:
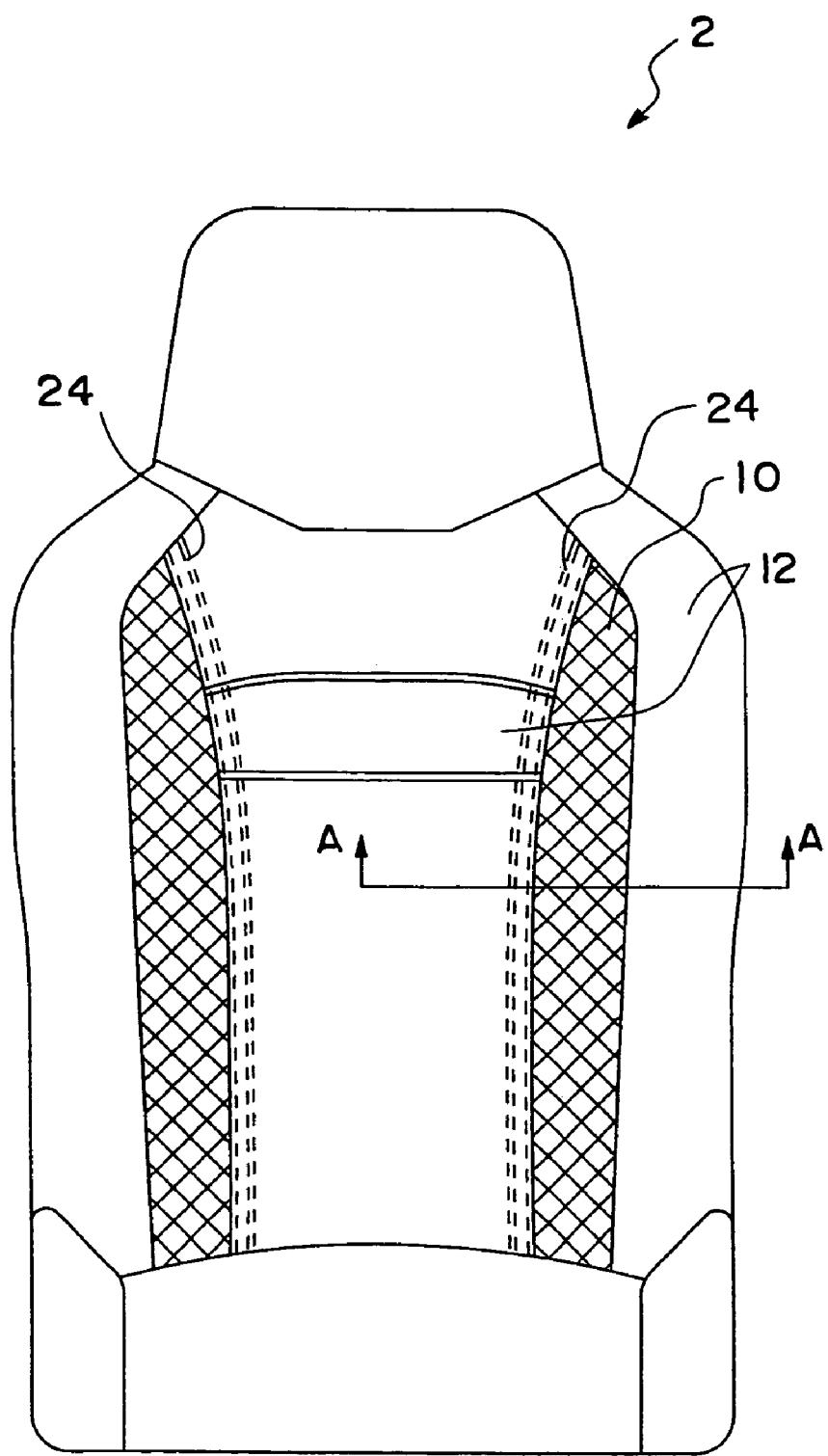
FIG. 1 is a front elevational view of a seat back according to the present invention.
Figure 2:
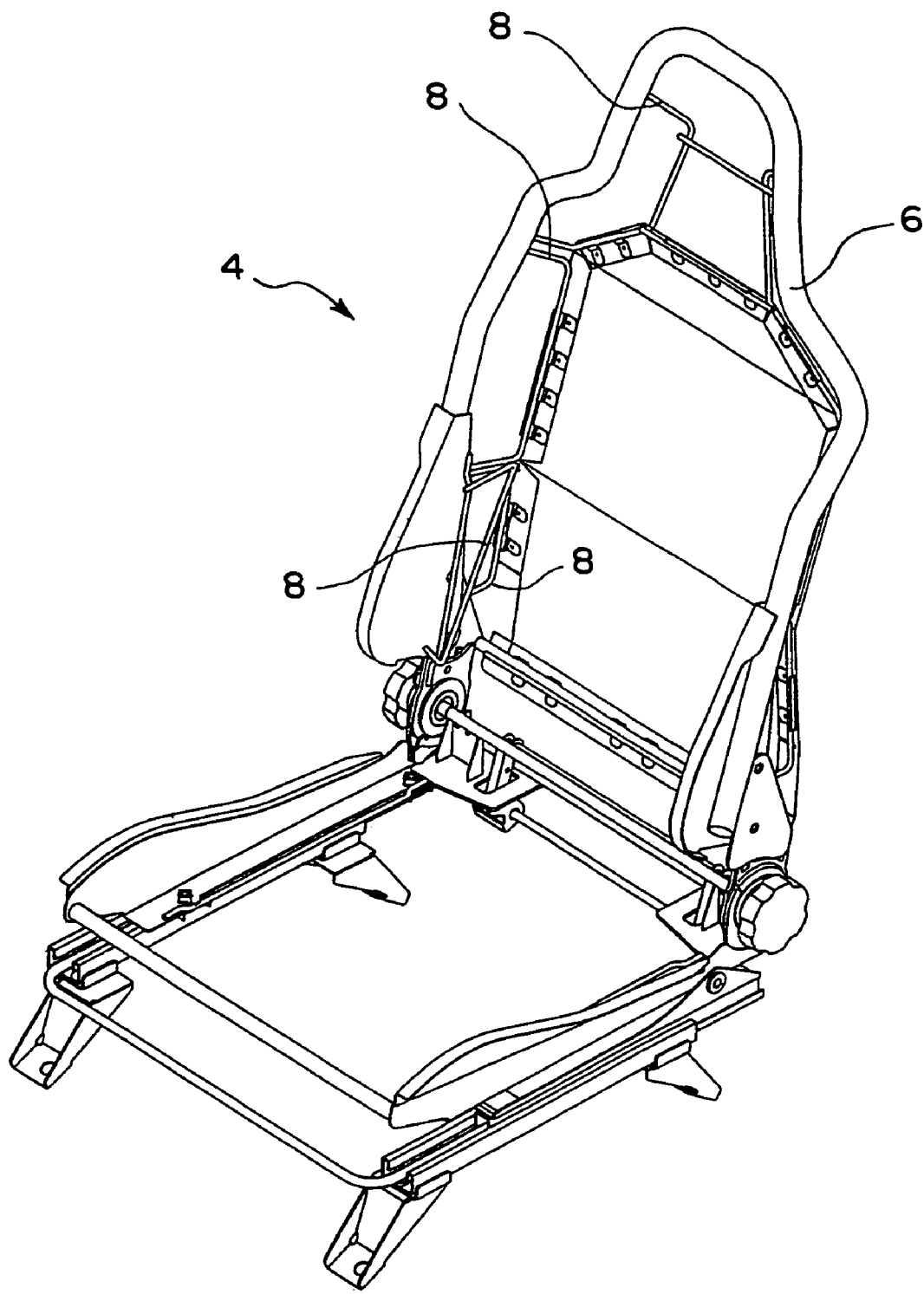
FIG. 2 is a perspective view of an automobile seat frame structure having a seat back frame mounted in the seat back of FIG. 1.

FIG. 1 depicts a seat back 2 having a seat structure according to the present invention. This seat back 2 is attached to a rear portion of a seat cushion (not shown). FIG. 2 depicts a frame structure of an automobile seat. The frame structure shown in FIG. 2 has a seat back frame 4, which is mounted in, for example, the seat back 2 shown in FIG. 1.

As shown in FIG. 2, the seat back frame 4 includes a pipe frame 6 of a predetermined shape and a plurality of trim retainers 8 having opposite ends secured to the pipe frame 6.

Figure 3A:
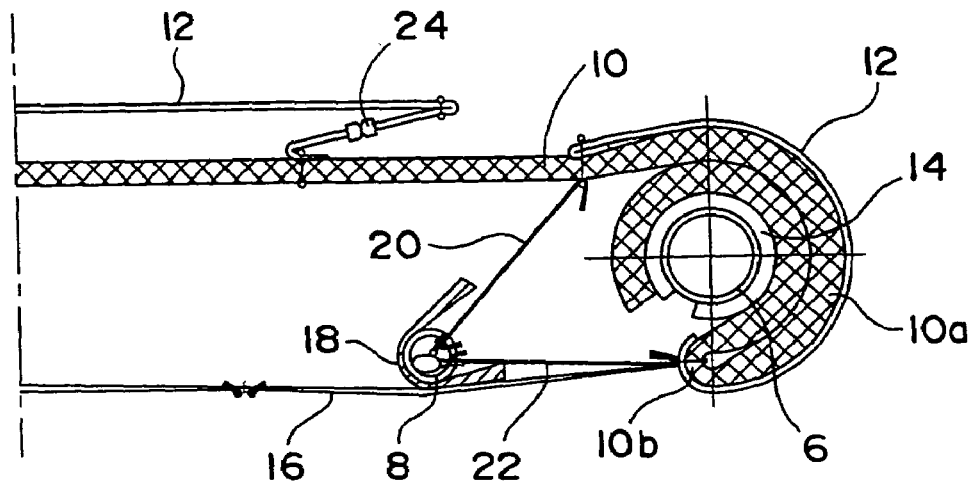
FIG. 3A is a cross-sectional view taken along line A—A in FIG. 1, particularly depicting a state in which a fastener has been closed.
Figure 3B:
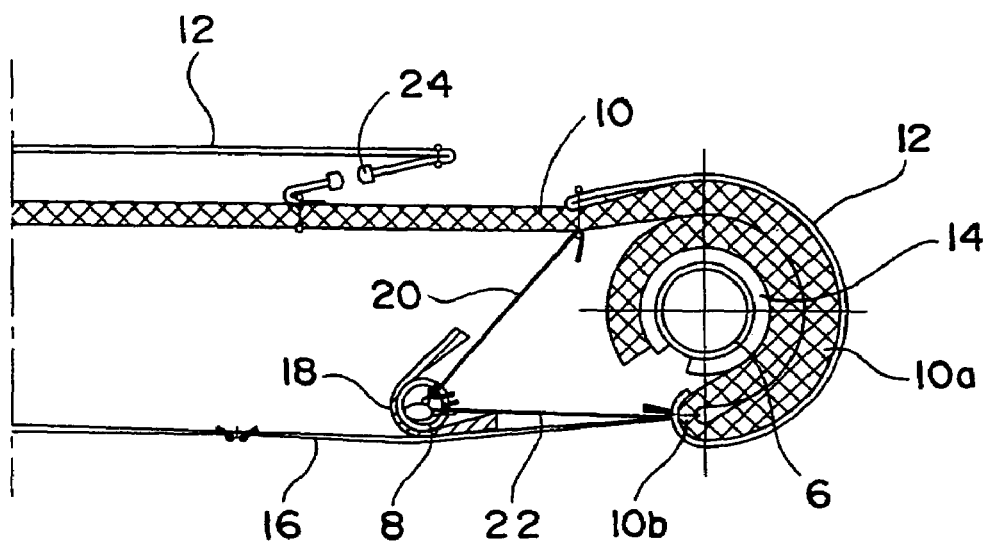
FIG. 3B is a view similar to FIG. 3A, but depicting a state in which the fastener has been opened.

As shown in FIG. 1 and FIGS. 3A and 3B, a three-dimensional net (hereinafter referred to as 3-D net) 10 is stretched over the seat back frame 4 and selectively covered with skin materials 12 such as, for example, leather at a central portion, opposite side portions, an upper portion (head rest portion), and a lower portion thereof.

The 3-D net 10 is formed of a three-dimensional knit fabric, which has a ground fabric formed into, for example, a knit texture or a honeycomb-shaped (hexagonal) mesh. The 3-D net 10 has a three-layered solid truss structure in which an upper mesh layer and a lower mesh layer are connected to each other by a pile layer having a large number of piles. Each yarn of the upper mesh layer and the lower mesh layer is formed by twisting a number of fine threads, while each of the piles is formed of a single thick string to provide the three-dimensional knit fabric with rigidity.

A predetermined tension is applied to the 3-D net 10 by a plurality of tension members 16, 20, 22 in the manner explained hereinafter.

The 3-D net 10 is folded at end portions thereof to form a double layer, and the folded portions 10a are wound around the pipe frame 6 with an elastic material 14 interposed therebetween. One end of a tension member 16 is sewn to a folded portion 10b behind the pipe frame 6 and, hence, opposite ends of the tension member 16 are sewn to two folded portions 10b located on opposite side portions of the pipe frame 6, respectively. The tension member 16 is held in contact with the trim retainers 8 with an elastic material 18 interposed therebetween.

Each folded portion 10a is covered with one of the skin materials 12, and an inner edge portion of the latter together with the 3-D net 10 is sewn to one end of a tension member 20, the other end of which is fastened to one of the trim retainers 8. An outer edge portion of the skin material 12 together with the folded portion 10b of the 3-D net 10 is sewn to one end of a tension member 22, the other end of which is fastened to one of the trim retainers 8.

The skin material 12 positioned at a central portion (the portion with which the back of the seat occupant is brought into contact) of the seat back 2 is connected at vertically extending opposite side edge portions thereof with the 3-D net 10 by means of two zippers 24 positioned on respective sides of the central skin material 12. That is, each zipper 24 employed as a fastener is sewn at one side edge portion thereof to a vertically extending side edge portion of the central skin material 12 and at the other side edge portion thereof to a portion of the 3-D net 10. As shown in FIG. 1, an upper edge portion of the central skin material 12 together with another skin material is sewn to the 3-D net 10. The same is true for a lower edge portion of the central skin material 12.

As shown in FIG. 3A, when both the zippers 24 are closed, the central skin material 12 and the 3-D net 10 positioned behind it are united to increase the surface rigidity. As a result, only the 3-D net 10 positioned laterally outwardly of the zippers 24 can easily expand and contract.

On the other hand, as shown in FIG. 3B, when the zippers 24 are opened, the opposite side edge portions of the central skin material 12 are separated from the 3-D net 10 to reduce the surface rigidity. As a result, the riding feeling in which the body of the seat occupant fits well with the seat is enhanced, and the 3-D net 10 expands and contracts as a whole according to a load applied thereto.

That is, the riding comfort can be optimized according to individual seat occupants by using the zippers 24 as connecting means for connecting the skin material 12 and the 3-D net 10 and by selectively opening or closing such connecting means.

Figure 4A:
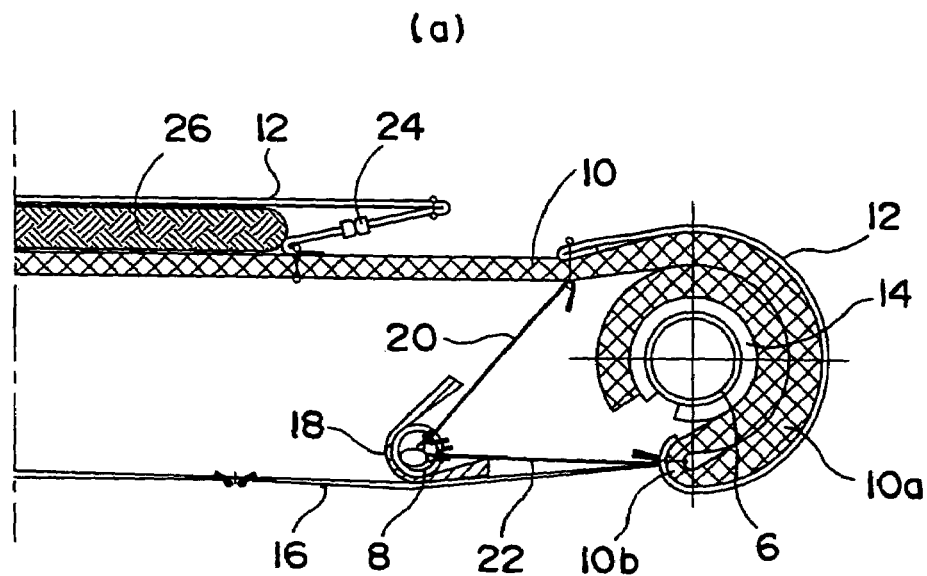
FIG. 4A is a cross-sectional view taken along line A—A in FIG. 1 when a cushioning material has been inserted between a three-dimensional net and a skin material, particularly depicting the state in which the fastener has been closed.
Figure 4B:
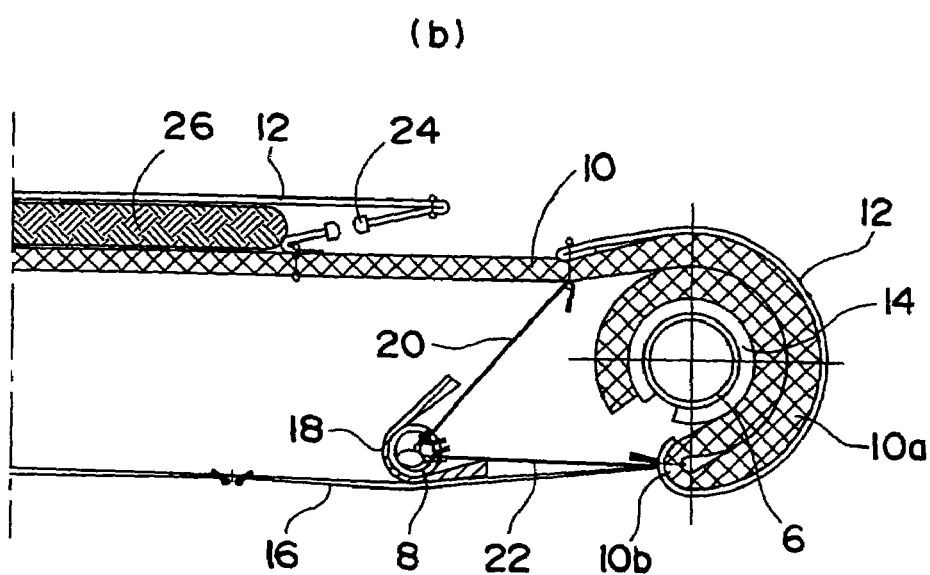
FIG. 4B is a view similar to FIG. 4A, but depicting the state in which the fastener has been opened.
Figure 5:
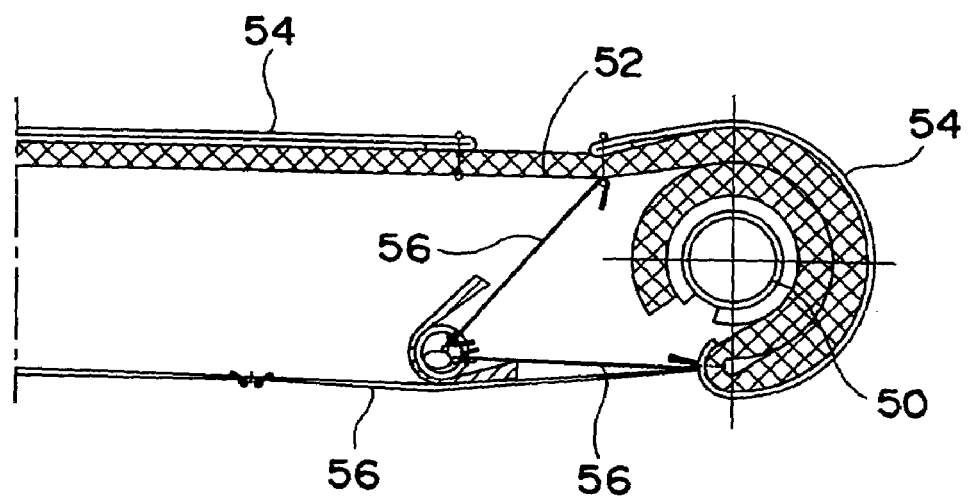
FIG. 5 is a horizontal sectional view of a conventional seat back.

Further, as shown in FIGS. 4A and 4B, upon opening at least one of the zippers 24, a cushioning material 26 such as, for example, urethane, a 3-D net or the like may be inserted between the 3-D net 10 and the central skin material 12. In this case, the presence of the cushioning material 26 reduces the vibration transmissibility, thus reducing fore and aft vibration of the seat back 2.

In addition, as shown in FIG. 4A, when the zippers 24 are closed, the riding feeling of being high in surface rigidity is obtained while reducing the fore and aft vibration of the seat back 2, and as shown in FIG. 4B, when the zippers 24 are closed, the riding feeling in which the body of the seat occupant fits well with the seat is enhanced while reducing the fore and aft vibration of the seat back 2.

It is to be noted here that although in the above-described embodiment the seat structure according to the present invention has been discussed as being applied to a seat back, the present invention is not limited to the seat back but can be equally applied to a seat cushion.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A seat structure comprising:
   a seat frame;
   a three-dimensional net stretched over the seat frame;
   a skin material covering a part of the three-dimensional net;
   a fastener for selectively releasably connecting a portion of the skin material and the three-dimensional net so as to connect said portion of said skin material to said three-dimensional net while said skin material is covering said part of said three-dimensional net, and so as to disconnect said portion of said skin material from said three-dimensional net while said skin material is covering said part of said three-dimensional net, surface rigidity of said skin material being higher when said fastener connects said portion of said skin material to said three-dimensional net than when said fastener does not connect said portion of said skin material to said three-dimensional net; and
   a cushioning material inserted between the three-dimensional net and the skin material to reduce a vibration transmissibility.

2. The seat structure according to claim 1, wherein said portion of said skin material releasably connected to said three-dimensional net by said fastener comprises at least one side edge portion of said skin material.

3. The seat structure according to claim 1, wherein said portion of said skin material releasably connected to said three-dimensional net by said fastener comprises opposite side edge portions of said skin material.

4. The seat structure according to claim 1, wherein said part of said three-dimensional net covered by said skin material is a part against which a back of a seat occupant presses.

* * * * *